Patented Nov. 27, 1951

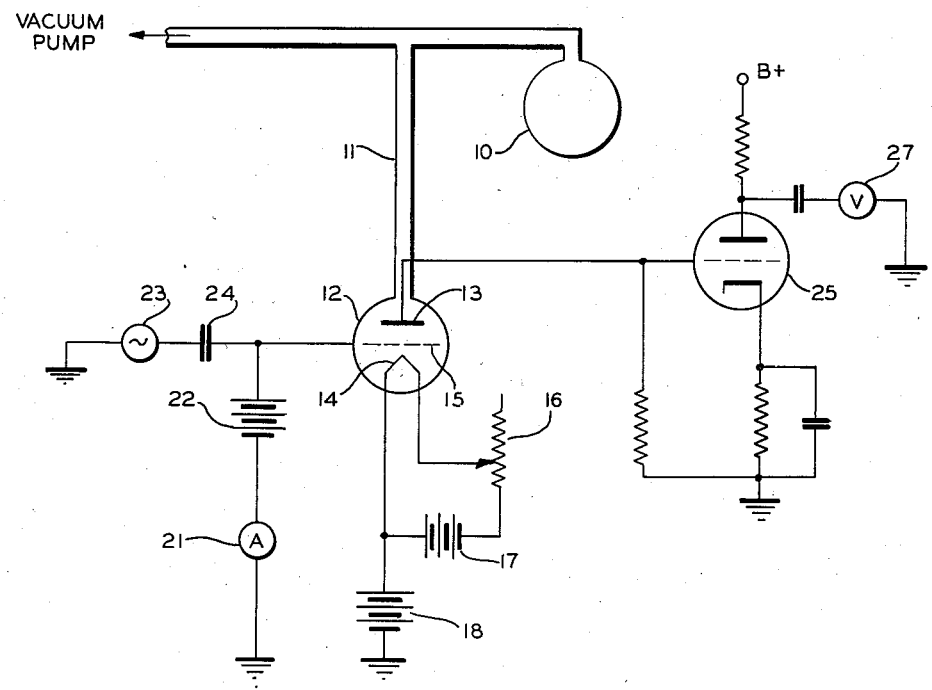

2,576,330

UNITED STATES PATENT OFFICE 2,576,330

IONIZATION GAUGE

Edward R. Beringer, Cambridge, Mass., assignor, by mesne assignments, to the United States of America as represented by the Secretary of the Navy Application December 10, 1945, Serial No. 634,117

7 Claims. (Cl. 175—183)

This invention relates to an electronic ionization gauge for indicating the vacuum in a vessel, and more particularly, to such an electronic ionization gauge incorporating the use of alternating current.

Heretofore, electronic ionization gauges have used direct current (D. C.) potentials throughout, which is undesirable because such potentials require either a direct coupled amplifier or a galvanometer to measure ion current. Direct coupled amplifiers are notoriously unstable, particularly as regards drifts in the zero setting, which has proved very annoying and inconvenient when used with an electronic ionization gauge. Likewise, the use of a galvanometer is unsatisfactory due to the very high sensitivity required, which has an accompanying fragility.

A primary object of the present invention is to generally improve ionization gauges by eliminating the foregoing difficulties.

Another and more specific object of the invention is to provide an electronic ionization gauge using an alternating current to provide the ionization indicating signal.

These and other objects will be apparent from the following specification when taken with the accompanying drawing which is a circuit diagram of an embodiment of the invention.

Referring to the drawing, a bulb 12 containing a cathode 14, grid 15 and plate 13, is connected by means of suitable tubing 11 to a vacuum pump (not shown), and a vessel 10 which is to be evacuated. The emission of the cathode 14 is controlled by a rheostat 16 in cooperation with a filament battery 17. The grid 15 is made positive with reference to the cathode 14 by a suitable battery 22, and the plate 13 is made negative with respect to the grid 15 and the cathode 14 by means of the aforementioned battery 22 and another battery 18 in the cathode circuit. The grid current may be read by use of a current meter, here a milliammeter 21, in the grid circuit as shown to aid in maintaining constant grid current. An alternating voltage source substantially constant in magnitude is placed on the grid 15 through a coupling capacitor 24 from a generator 23, which may be a sine wave generator.

In operation, the electrons from the hot cathode 14 are accelerated toward the grid 15. Those electrons that pass through the grid 15 into the grid-plate region are repelled by the plate 13. Simultaneously, the gas in the region is ionized in proportion to the number of particles present, resulting in the formation of positive ions which are drawn to the plate 13, causing a plate current. As the grid 15 is being modulated by a constant alternating voltage, the resulting plate current is also alternating in form and may be amplified by a conventional amplifier circuit, consisting of a triode 25 and its associated components, and a reading obtained from an alternating current meter 27. This reading will be a measure of the number of gas molecules per unit of volume in the container 10 or 12.

The invention described in the foregoing specification need not be limited to the details shown, which are considered to be illustrative of one form the invention may take. For example, the alternating current generator may be introduced in series with the cathode 14 rather than in parallel therewith as illustrated, or used in any method in which the resultant voltage between grid and cathode is modulated.

What is claimed is:

1. An electronic ionization gauge for measuring gas pressures comprising a bulb, a plate, a cathode and a grid enclosed in said bulb, a source of alternating voltage connected between said grid and said cathode, means for returning said plate to a substantially fixed potential negative with respect to said cathode and said grid, and voltage indicating means in circuit with said plate and actuated by the voltages on said plate for providing an indication of pressure within said bulb.

2. An electronic ionization gauge for measuring gas pressures comprising, a bulb enclosing a plate, a cathode, and a grid, means for biasing said cathode and said grid positive with respect to said plate, means for biasing said grid positive with respect to said cathode, an alternating voltage source connected between said grid and said cathode, an amplifier connected in circuit with said plate, and voltage indicating means in the output of said amplifier for providing an indication of pressure in said bulb.

3. An electronic ionization gauge for measuring gas pressures in a vessel comprising, a bulb enclosing a plate, a cathode and a grid, said vessel communicating with said bulb, means for biasing said grid and cathode positive with respect to said plate, means for biasing said grid positive with respect to said cathode, a source of alternating voltage capacitively coupled to said grid and said grid biasing means, a current meter connected in the circuit of said grid biasing means, an amplifier connected in circuit with said plate, and an alternating voltage indicator connected in the output of said amplifier for providing an indication of gas pressure in said vessel.

4. An electronic ionization gauge for measuring low gas pressures comprising a bulb enclosing a plate, a grid and a cathode, means for biasing said grid positive with respect to said cathode, means for biasing said plate negative with respect to said grid and said cathode, whereby positive ion current flow to said plate is effected, means for introducing an alternating signal into the circuit of said grid whereby said positive ion current is modulated, means for amplifying said modulated positive ion current, and an alternating voltage indicating device in the output of said amplifying means.

5. An electronic ionization gauge for measuring low gas pressures comprising, a bulb enclosing a plate, a grid, and a filamentary cathode, a first direct current source in circuit with said grid for biasing said grid positive with respect to said cathode, means for superimposing an alternating signal on said grid, a second direct current source for biasing said plate negative with respect to said grid and to said cathode, whereby electrons emanating from said cathode cause the formation of positive ions which flow to said anode, said positive ion flow being modulated by said alternating signal, a load impedance coupled to said anode across which a modulated signal is generated in response to said modulated ion flow, means for amplifying said modulated signal, and means for indicating said amplified modulated signal as a measure of gas pressure within said bulb.

6. Apparatus as in claim 5, including a system under evacuation communicating with said bulb and means for providing an adjustable voltage to said filamentary cathode to vary the electron emission therefrom whereby a desired density of positive ions may be maintained under varying gas pressures in said system.

7. An electron ionization gauge for measuring low gas pressures comprising, a system under evacuation, a bulb communicating with said system, a cathode, a plate and a grid enclosed by said bulb, means for energizing said cathode to cause electron emission therefrom, means for biasing said plate and said grid to cause production of positive ions to be collected at said plate, means for modulating the flow of said positive ions with an alternating signal, a load impedance coupled to said anode across which a modulated signal is generated in response to said modulated ion flow, means for amplifying said modulated signal, and means for indicating the output of said amplifier as a measure of gas pressure within said system.

EDWARD R. BERINGER.

REFERENCES CITED

The following references are of record in the file of this patent:

UNITED STATES PATENTS

| Number | Name | Date |
|---|---|---|
| 1,592,364 | Houskeeper | July 13, 1926 |
| 1,649,016 | Buckley | Nov. 15, 1927 |
| 2,045,800 | Richter | June 30, 1936 |
| 2,375,280 | Calbick | May 8, 1945 |